United States Patent [19]
Field et al.

[11] Patent Number: 5,594,169
[45] Date of Patent: Jan. 14, 1997

[54] OPTICALLY SENSED WIRE GYROSCOPE APPARATUS AND SYSTEM, AND METHODS FOR MANUFACTURE AND CURSOR CONTROL

[75] Inventors: John Field, Woodside; Steven P. Hotelling, Cupertino, both of Calif.

[73] Assignee: Gyration,Inc., Saratoga, Calif.

[21] Appl. No.: 334,675

[22] Filed: Nov. 4, 1994

[51] Int. Cl.[6] .............................. G01P 9/04; G01C 19/00
[52] U.S. Cl. .................................. 73/504.14; 73/514.26; 74/5.6 A
[58] Field of Search ............................ 73/504.14, 503.3, 73/504.01, 504.08, 504.18, 514.39, 514.16, 514.19, 514.26; 74/5.46, 5.6 A

[56] References Cited

U.S. PATENT DOCUMENTS

| | | | |
|---|---|---|---|
| Re. 22,409 | 12/1943 | Lyman et al. | 33/204 |
| 2,309,583 | 2/1943 | Lyman et al. | 33/204 |
| 2,514,250 | 7/1950 | Meredith | 264/1 |
| 2,542,018 | 2/1951 | Ferrill | 33/204 |
| 3,106,847 | 10/1963 | Mullins et al. | 73/505 |
| 3,302,465 | 2/1967 | Mathey | 73/505 |
| 3,349,627 | 10/1967 | Hauf | 73/505 |
| 3,354,724 | 11/1967 | Kabaian et al. | 73/505 |
| 3,504,554 | 4/1970 | Taylor | 73/505 |
| 3,515,003 | 6/1970 | Taylor | 73/505 |
| 3,520,193 | 7/1970 | Grangroth | 73/505 |
| 3,538,774 | 11/1970 | Quick | 73/505 |
| 3,680,392 | 8/1972 | Hoffman et al. | 73/516 |
| 3,903,747 | 9/1975 | Johnston | 73/505 |
| 3,913,405 | 10/1975 | Ljung et al. | 73/505 |
| 3,992,952 | 11/1975 | Hutton et al. | 73/505 |
| 4,267,731 | 5/1981 | Jacobson | 73/505 |
| 4,300,390 | 11/1981 | Shimizu | 73/178 R |
| 4,361,054 | 11/1982 | Bailey | 74/5.6 |
| 4,441,375 | 4/1984 | Minohara | 74/5.46 |
| 4,454,777 | 6/1984 | Krupick et al. | 74/5.46 |
| 4,489,609 | 12/1984 | Burdess et al. | 73/505 |
| 4,644,793 | 2/1987 | Church | 73/505 |
| 4,694,696 | 9/1987 | Hojo et al. | 73/497 |
| 4,710,668 | 12/1987 | Fima et al. | 310/323 |
| 4,792,676 | 12/1988 | Hojo et al. | 73/504.18 |
| 4,802,364 | 2/1989 | Cage et al. | 73/505 |
| 4,836,023 | 6/1989 | Oikawa | 73/505 |
| 4,862,050 | 8/1989 | Parfomak et al. | 74/5.6 A |
| 4,961,352 | 10/1990 | Downer et al. | 74/5.46 |
| 5,097,707 | 3/1992 | Church | 73/505 |
| 5,189,913 | 3/1993 | Netzer et al. | 73/504.08 |
| 5,193,391 | 3/1993 | Cage | 73/505 |

*Primary Examiner*—Hezron E. Williams
*Assistant Examiner*—Helen C. Kwok
*Attorney, Agent, or Firm*—Albert C. Smith

[57] ABSTRACT

Single and dual wire gyroscopes determine the orientation and attitude of a device using optical sensing of radiation interrupted by current-carrying, vibrating tensioned wires within a magnetic fields. The tensioned wires vibrate between end nodes within the respective magnetic fields to provide both sustaining oscillatory drives and the sensing of velocity in the directions perpendicular to the respective magnetic fields. Lateral displacements of tensioned wires in directions parallel to the associated magnetic fields are sensed using radiant illumination of the wires and radiation sensing below the wires to provide displacement signals. Precession of wires in vibratory trajectories out of planes perpendicular to respective magnetic fields are controlled by selectively twisting and bending the tensioned wires between mounting ends.

48 Claims, 11 Drawing Sheets

OPTICALLY SENSED WIRE GYROSCOPE APPARATUS AND SYSTEM, AND METHODS FOR MANUFACTURE AND CURSOR CONTROL

FIELD OF THE INVENTION

This invention relates generally to gyroscope devices, and more particularly to a vibrating wire gyroscopic device and method which translates rotational movement to information signals for use, for example, in coordinate positioning of a displayed cursor in a graphic display system.

BACKGROUND OF THE INVENTION

Gyroscopic devices commonly rely upon rotating elements to provide reference orientations relative to one or more axes in coordinate space. Certain known gyroscopic devices also rely upon vibrating beams or wires to identify reference planes in which the beams or wires vibrate in order to provide output responses representative of movements relative to the reference planes. Devices of these types are described in the literature. (E.g., U.S. Pat. Nos. 3,504,554; 3,903,747; 3,538,774; and 3,992,952).

The vibrating wire gyroscope may be broken into two distinct classes, namely vibrating wire rate gyroscopes and vibrating wire position gyroscopes. A vibrating wire position gyroscope is described in U.S. Pat. No. 3,106,847 ('847). Vibrating position gyroscopes may be driven along the axis of the wire, as in '847. Alternatively, vibrating position gyroscopes may be driven in a direction perpendicular to the wire, but continuously aligned to the vibration plane of the wire. Continuous alignment of the vibration drive force can be accomplished by four electrostatic plates as described, for example, in U.S. Pat. No. 3,538,774.

Vibrating wire rate gyroscopes may be driven perpendicular to the wire in a direction which remains constant relative to the associated housing. This type of drive is the simplest to implement, and therefore the least costly to manufacture. An example of this type of instrument is disclosed in U.S. Pat. No. 3,515,003. The driving force is accomplished by passing alternating current through the wire, which is in a permanent magnet field.

Sensing the motion of the wire presents technological challenges. Prior designs utilizing capacitance measurements and electromagnetic measurements encountered difficulties in avoiding undesirable interaction between the drivers and sensors. Some designs use two antinodes with one node in the center with the wire vibrating at its second harmonic so that one side of the wire may be excited and the other side sensed. Other designs use high frequency modulation and demodulation to separate the sensors from the drivers.

In conventional vibrational gyroscopic devices, the bandwidth of the motion signal from a lateral drive vibrating element is limited to the bandwidth of the vibrating element. Therefore, there is a need for a device that obtains a high bandwidth motion signal from a lateral drive vibrating instrument with a low bandwidth (high Q, low natural frequency vibration) vibrating element.

Such gyroscopic devices, when incorporated into input pointer devices for controlling the position of display cursors in television or computer systems, thus alleviate the need for physical reference surfaces against which operator's manual movements in relation to such reference surfaces can be sensed and translated into coordinate information for positioning displayable cursors.

Such gyroscopic devices can thus replace conventional mouse-type input devices that require a physical support surface with respect to which relative movement can be sensed for positional information that is then used to manipulate a cursor in a computer-controlled display system.

SUMMARY OF THE INVENTION

In accordance with the present invention, a wire gyroscope for sensing orientation in various axes uses optical sensing in conjunction with a simple electromagnetic drive and is useable over a wide bandwidth while maintaining accurate low frequency performance. The electromagnetic drive houses one wire, or two perpendicular wires associated with corresponding axes of rotation within a single casing. The wires are selectively torqued and stretched between respective magnetic fields. Oscillating currents are supplied through the wires to induce harmonic motion oriented within the respective magnetic fields. Motion of the wires is sensed optically, and converted to rotation rate output signals.

BRIEF DESCRIPTION OF THE DRAWINGS

FIG. 1B is a diagram illustrating the light emitting diode (LED) and vibrating wires.

DETAILED DESCRIPTION OF THE PREFERRED EMBODIMENT

Figure 1:
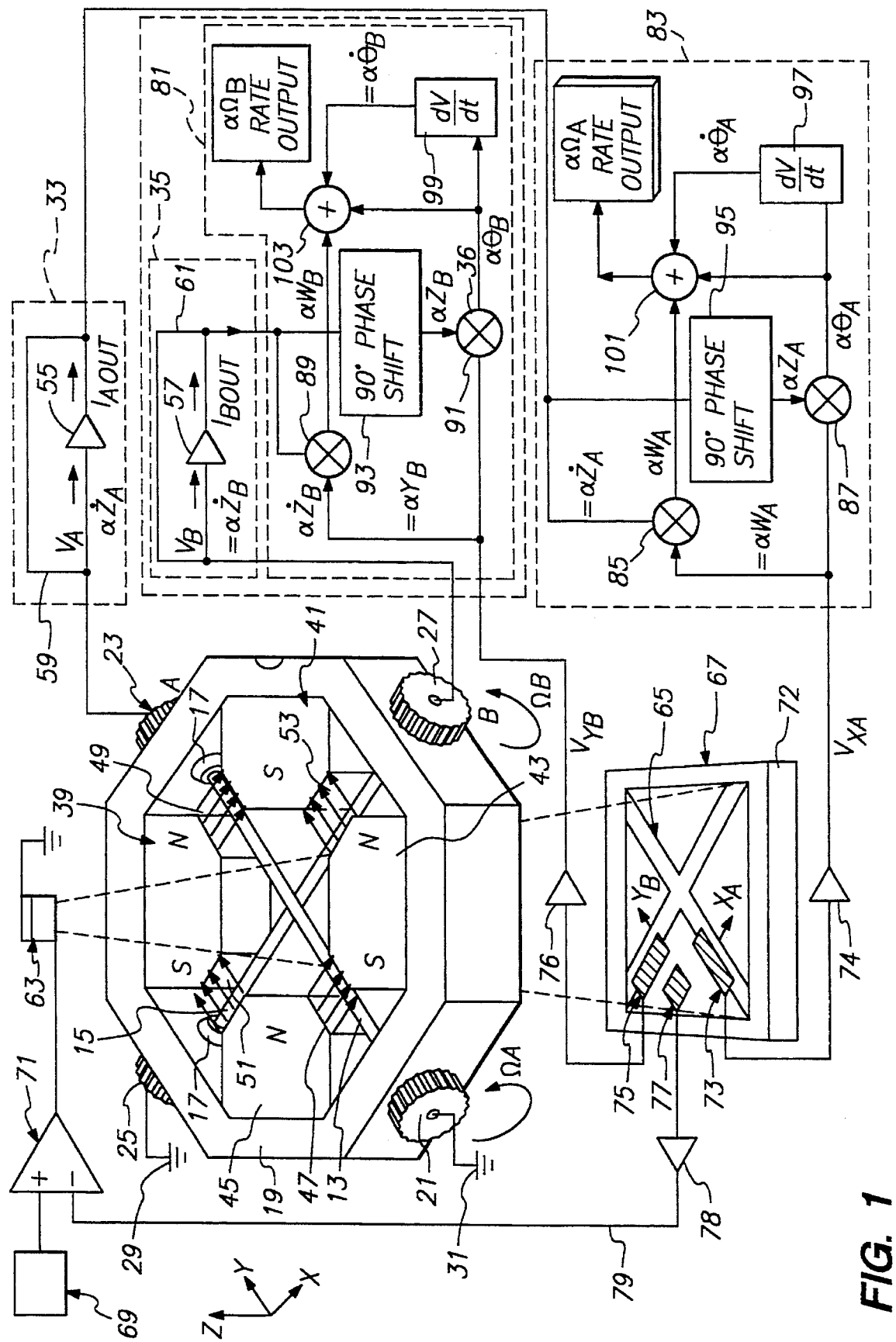
FIG. 1 is a block diagram of a dual wire gyroscope according to the present invention.

Referring to FIG. 1, the preferred embodiment of the instant invention is an optically sensed dual wire gyroscope 11 for translating vibration into an orientation signal. In the preferred embodiment, gyroscope 11 includes two vibrating wires 13, 15 which are perpendicularly disposed with one another in order to detect two degrees of motion. However, the gyroscope 11 may include only a single vibrating wire 13 and detect only one degree of motion, or the gyroscope 11 may include N vibrating wires to detect N degrees of motion where N is any positive integer greater than '0'. For clarity of description, wires 13 and 15 will be discussed in relation to the elements of gyroscope 11. All references to specifications of size, model, and make as to any of the elements refer solely to a preferred embodiment to implement the invention and are not limitations as to the nature of the invention.

Wires 13, 15 are of length 0.50" and diameter 0.003" stainless steel. Alternate materials such as PD35 wire manufactured by Phelps Dodge, or gold-plated fiber-optic cable may be useable. Operable criterion for the selection of suitable wire include low vibration loss, environmental resistance, and drawability. Wires 13, 15 are inserted through openings 17 in frame 19 and tensioned between insulators 21, 23 and 25, 27, respectively, which are mounted on the outside of frame 19. Wires 13, 15 connect to grounds 29, 31 at one end, respectively, and to oscillator current sources 33, 35 at the opposite end. Openings 17 in frame 19 are selected of sufficient diameter to avoid interference with the vibration of wires 13, 15. The maximum deflection of wires 13, 15 at the midsection is selected at about 0.002". The length and maximum deflection of wires 13, 15 are selected to reduce elastic strain to a value of about 4E-5 and extend useful lifetime according to the expression $$\text{delta}\_l/l\_0 = 8/3 (\text{delta}\_y/l\_0)^2 \qquad (Eq. 1)$$

where l_0=initial length of wire;

delta_l=stretched length of wire when fully deflected;

delta_y=maximum deflection of wire.

Permanent magnets 39, 41, 43, 45 are formed of 35 MGO Neodymium-Iron-Boron (NdFeB) material and spaced about the interior of frame 19 with a separation between opposing pole faces of about 0.030". The magnets are commercially available from Ted Davis Manufacturing of Longmont, Colo. and have been selected for geometrical simplicity. Each pole face is 0.080"×0.150" and parallel to the opposing pole face. Each pair of pole faces develop about a 7,000 gauss, fixed magnetic field across respective gaps 47, 49, 51, 53. Between gaps 47, 49 respective portions of current-carrying wire 13 are suspended, and between gaps 51, 53, respective portions of current-carrying wire 15 are suspended. In order to obtain field lines across the gaps and consequential forces acting in the same direction upon both portions of a given current-carrying wire 13, 15, a four magnet design is shown with an eight-pole configuration. In this configuration, magnet 45 has two north pole faces respectively opposite south pole faces of magnets 39, 43. Similarly, magnet 41 has two south pole faces respectively opposite north pole faces of magnets 39, 43. Frame 19 is formed of ferromagnetic stainless steel and serves as a magnetic flux return path. Magnetic anisotropies much less than 1%, i.e. <<70 gauss for 7 k gauss field are preferred where wire anisotropies approximate 1 %. Preferably, induced magnet eddy currents are reduced by selection of a sufficient gap with respect to the current carried by wires 13, 15. Preferably, no more than a 10 gauss fluctuation is acquired over a 0.002" deflection distance. This may be achieved by careful pole tip tolerances approximating parallelism to within about 0.003".

Oscillatory vibrations are induced in wires 13, 15 by passing oscillating currents ia, ib through the wires to cause the wires 13, 15 to be deflected by magnetomotive forces within the static field lines created by the magnets, and thereby to be alternately pushed upward and downward in a direction perpendicular to a plane defined by the respective magnetic fields. When wires 13, 15 flex in the z-direction (which is mutually perpendicular to the plane established by the axis of the respective wires and the respective magnetic fields), voltages va, vb are generated as counter-, or back-voltages attributable to the movement of a conductor through a magnetic field, and these voltages va and vb are proportional to the velocity of the respective wires 13, 15 in the z-direction.

Oscillators 33, 35 supply oscillating currents to wires 13, 15. Oscillators 33, 35 include transimpedance amplifiers 55, 57 which produce respective currents ia, ib substantially proportional to voltages va, vb. Currents ia, ib are driven through respective feedback loops 59, 61, and through wires 13, 15 to force wires 13, 15 in the same direction as their respective instantaneous velocities. This forms a self-oscillating loop which vibrates wires 13, 15 at fundamental resonances. Amplifiers 55, 57 have adjustable gain, or are output current limited, in order to maintain the amplitude of voltages va, vb substantially constant, which in turn maintains the vibrational amplitudes of wires 13, 15 substantially constant. Amplifiers 55, 57 thus generate electrical currents ia, ib proportional to the respective velocities of the wires 13, 15 in the z-direction.

Figure 1C:
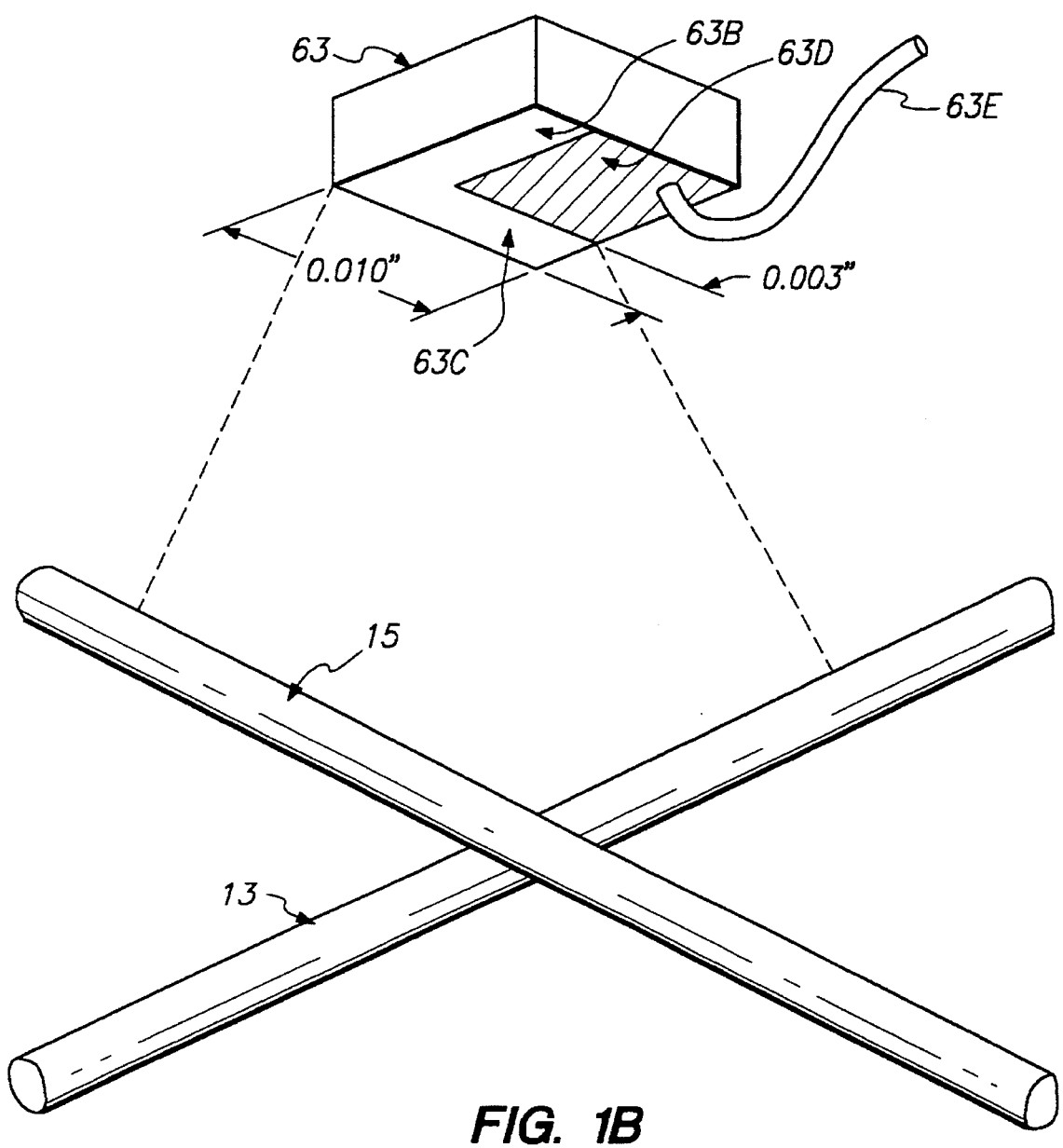
FIG. 1C shows the LED with a round aperture.
Figure 1C:
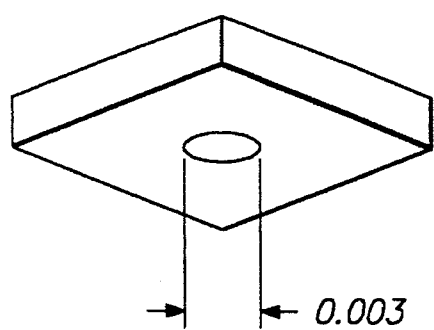
Figure 1D:
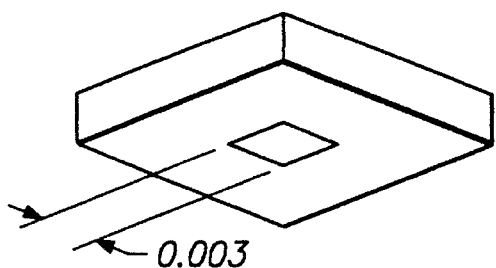
FIG. 1D shows the LED with a square aperture.

Light emitting diode (LED) 63 illuminates wire 13, which casts a shadow 65 on optical sensing system 67. LED 63 is a light-emitting diode (LED) that is manufactured by Texas Optoelectronic, Inc. and that emits radiation at about 880 nm for coupling to a silicon photoiodide. LED 63 may emit light from a circular 0.003" diameter area (FIG. 1C) or from a 0.003" square area (FIG. 1D).

Referring to FIG. 1B, LED 63 has an L-shaped emitting area comprised of stripe 63B adjoining stripe 63C. Each stripe is 0.003"×0.010". Stripe 63B provides imaging light for wire 15, and stripe 63C provides imaging light for wire 13.

This design utilizes a large percentage of the chip area (more than 50%), thus providing a good light to LED power supply current ratio for gallium aluminum arsenide LED material. LED 63 is spaced approximately 0.070" above wires 13, 15. Optical sensing system 67 includes a monolithic photoiodide 72 upon which photosensors 73, 75 are manufactured for sensing the amount of light from LED 63 received in a region beneath wires 13, 15, respectively, at a given instant. Photosensors 73, 75 may be standard silicon photodiode detectors spaced approximately 0.070" beneath wires 13, 15. Shadow 65 partially covers photosensors 73, 75. Lateral motions of wires 13, 15, in the direction of xa, ya, respectively, create changes in the amounts of light reaching respective photosensors 73, 75. The total amount of radiation reaching photosensors 73, 75 is substantially proportional to the lateral movement of wires 13, 15, respectively, and this produces an associated voltage vxa, vxb in photosensors 73, 75.

Photosensor 77 receives 'light' or radiation from LED 63 directly to provide a light intensity feedback signal through a pre-amplifier 78 and along conductor 79 to amplifier 71. Amplifier 71 controls the brightness of the light source 63 so that the feedback signal from photosensor 77 matches a reference signal from reference signal source 69. The amplifier 71 may include a low pass filter to reduce noise, particularly noise at the wire vibration frequencies. The closed loop control of LED 63 compensates for gain variations in LED 63 and photosensors 73, 75, 77 over time and temperature variations.

Demodulating circuits 81, 83 receive signals proportional to displacement in the xy-plane and z-direction from photosensors 73, 75 and oscillators 33, 35, respectively, and determine a magnitude and direction of displacement of wires 13, 15. Photosensor 73 is connected through preamplifier 74 to supply voltage vxa to multipliers 85, 87, and photosensor 75 is connected through pre-amplifier 76 to supply voltage vyb to multipliers 89, 91. Demodulating circuits 81, 83 include phase shifters 93, 95 to introduce a 90 degree phase delay to the signal obtained from oscillators 33, 35, which produces a signal proportional to the position of the respective wire in the z-direction. Mixers 87, 91 respectively demodulate the xa displacement signal with the z position signal to produce a signal proportional to ellipse skew distance d (shown in FIG. 2), and the yb displacement signal with the z position signal to produce a signal proportional to ellipse skew distance (analogous to FIG. 2). For small angles, vibration plane angles theta_a, theta_b (theta_a defined and discussed below, theta_b follows by analogy) are proportional to ellipse skew distances, so the signals produced by mixers 87, 91 in FIG. 1 are proportional to theta_a, theta_b, respectively. From the outputs of mixers 87, 91, differentiators 97, 99 produce d(theta_a)/dt, d(theta_b)/dt, respectively. Mixers 85, 89 respectively demodulate the xa displacement signal with the za velocity signal to produce a signal proportional to the ellipse width w and demodulate the yb displacement signal with the zb velocity signal to produce a signal proportional to the analogous ellipse width. Ellipse width w is proportional to minor axis length B for small angles. Summer 101 adds the signals from mixer 87, differentiator 97 and mixer 85 to produce rate output omega_a, and summer 103 adds the signals from mixer 91, differentiator 99 and mixer 89 to produce rate output omega_b. (This summing operation is electrically equivalent to the equation for case_omega, discussed below).

Wires 13, 15 are vibrated at different frequencies so that optical and electrical signals associated with one wire may be readily filtered out and distinguished from optical and electrical signals associated with the other wire. For example, wire 13 may be tensioned to vibrate at 8 kHz, while wires 15 may be tensioned to vibrate at 6 kHz. If the yb signal was added to the xa signal, mixers 85, 87 would shift the signal frequency of the yb signal from 6 kHz to a signal with frequency content at 2 KHz and 14 KHz. These undesirable signals may be readily filtered from the rate output signal omega_a. The analogous network 89, 91 separates undesirable signals to obtain the rate output signal omega_b.

In another embodiment of the present invention, the output voltage signals from photosensors 73, 75 are added together, and then each signal is extracted by the mixing electronics that are discussed above. This embodiment has the advantage that the same pre-amplifier may be used for the output voltage signals from photosensors 73, 75. The signal processing circuit illustrated in FIG. 1, including the photosensors 73, 75, 77, may be combined on the same semiconductor chip.

Figure 2:
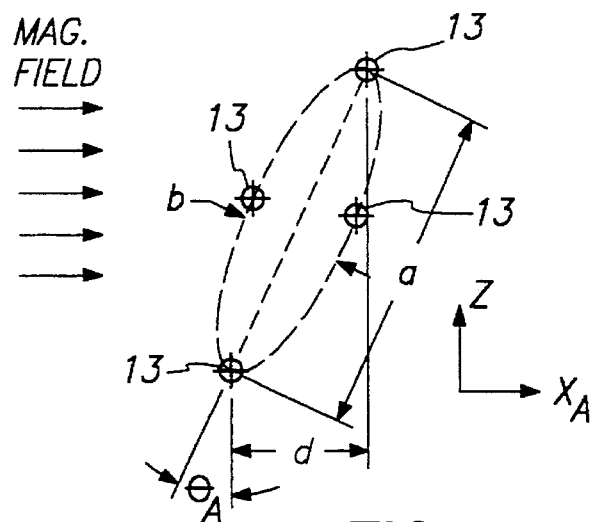
FIG. 2 is a diagram illustrating the general path of the cross section of wire 13 at its midpoint.

FIG. 2 is a diagram illustrating the general path of a central cross section of wire 13, and may be characterized by elliptical path width w and elliptical tilt angle theta. The component of position of the wire which is parallel to the magnetic field is described by the xa coordinate. The component of the position of the wire which is mutually perpendicular to the magnetic field and the wire axis is described by the z coordinate.

As shown in FIG. 1, the xa coordinate of wire 13 is measured by the optical sensing system 67, which produces electrical signal (voltage) vxa, proportional to the xa coordinate. The velocity of wire 13 in the z-direction is measured by the voltage across wire The primary restoring force on wire 13, 15 is the tension in the wire coupled with its physical displacement from its normal axis. For a real wire which is not infinitely flexible, there is a portion of the restoring force which is due to bending of the wire. The greatest bending occurs near the end attachment points of each wire. If the shape of the wire is not perfectly round in cross-section, or the material is not perfectly homogeneous, or the attachment to the wire is not perfectly symmetrical, then the wire will tend to bend more or less easily in different directions of the bending. This condition is referred herein to a anisoelasticity.

Figure 3:
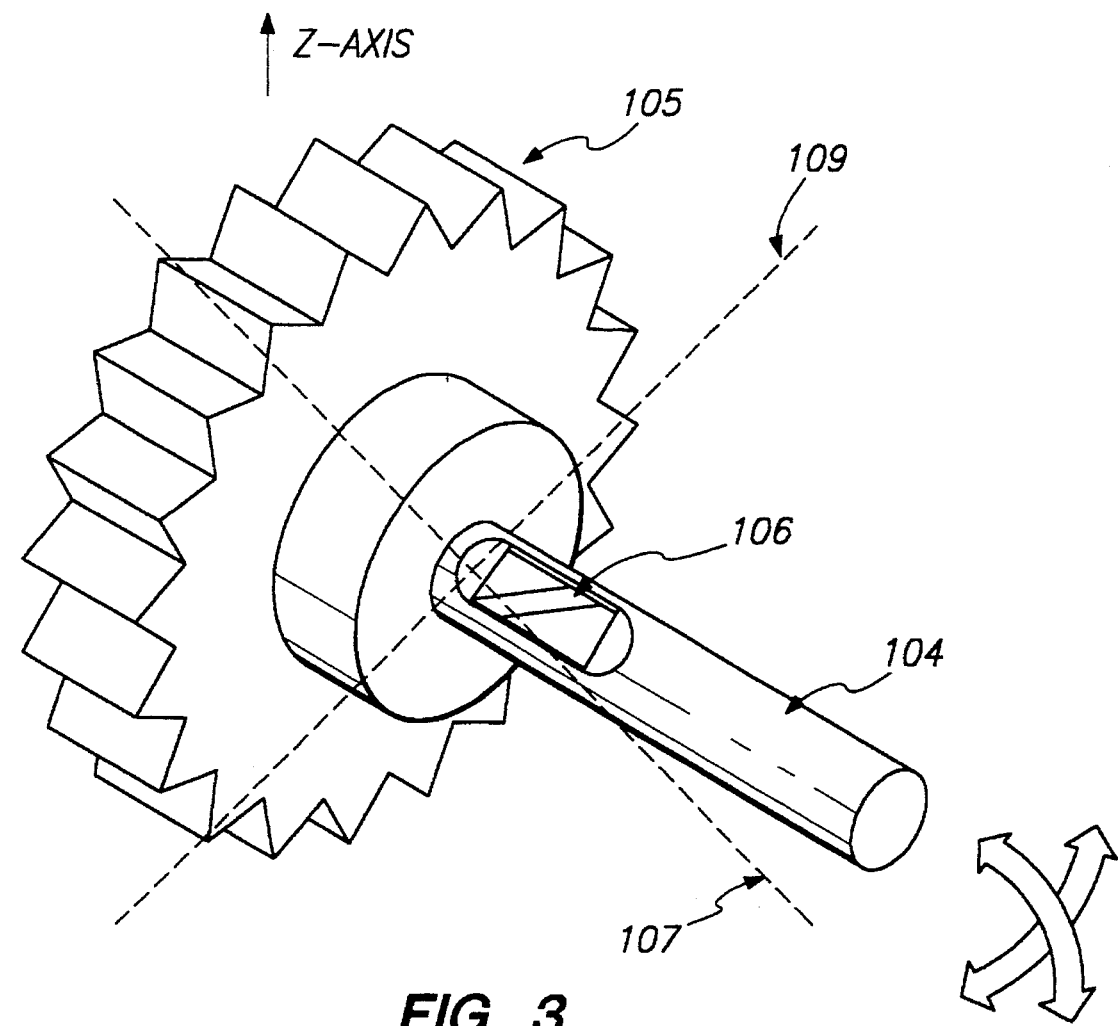
FIG. 3 is a diagram illustrating a tensioned wire end and the axes of the principle bending moments of inertia.

Referring to exploded pictorial illustration of FIG. 3, an example is shown of anisoelasticity. Tensioned wire end 104 is attached to insulator 105. Frame 19 is not shown in this view for clarity. Wire end 104 is shown with a hypothetical imperfection 106. The bending moment of inertia of the wire may be characterized by the strongest and weakest principal moments of inertia, about the strongest and weakest principal axes. In this example, the strong principal axis is 107 and the weak principal axis is 109. Anisoelasticity is the difference between the moment of inertia of the strong principal axis and the moment of inertia of the weak principal axis.

Figure 4:
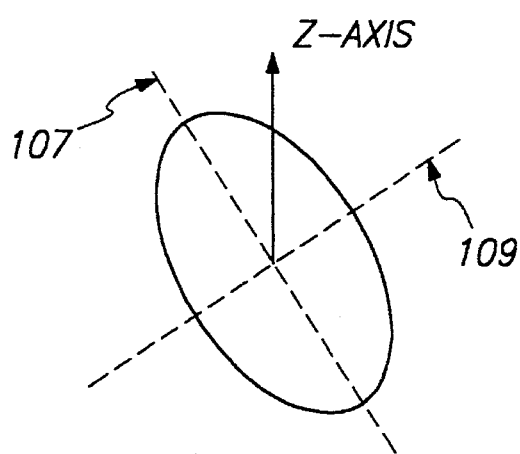
FIG. 4 is a graphical illustration of the magnitude of the total bending moment of inertia versus the bending axis angle.

FIG. 4 is a polar graph which illustrates the magnitude of the total bending moment of inertia versus the bending axis angle. The magnitude of the total bending moment of inertia is highest when wire 13 is bent along the strong principal axis 107, and it is lowest when bent along the weak principal axis 109. The shape of the graph is elliptical. The anisoelasticity is the difference in magnitude between the strong principal moment of inertia and the weak principal moment of inertia.

Figure 5:
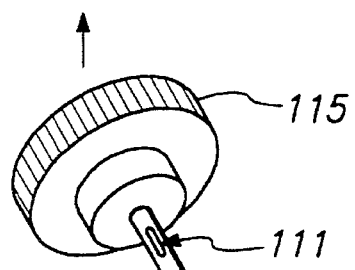
FIG. 5 is a diagram illustrating a tensioned wire end and the insulators according to the present invention.
Figure 6:
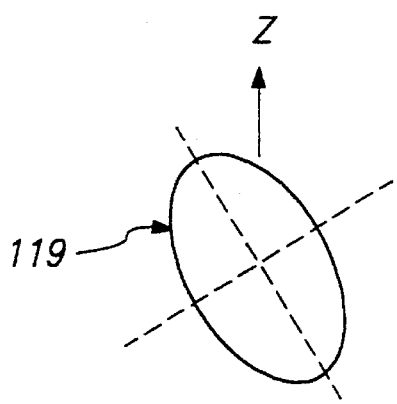
FIG. 6 is a graphical illustration of the magnitude of the bending moment of inertia about the z-axis of end 111.
Figure 7:
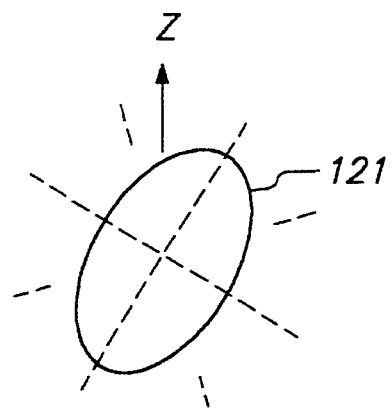
FIG. 7 is a graphical illustration of the magnitude of the bending moment of inertia about the z-axis of end 113.
Figure 8:
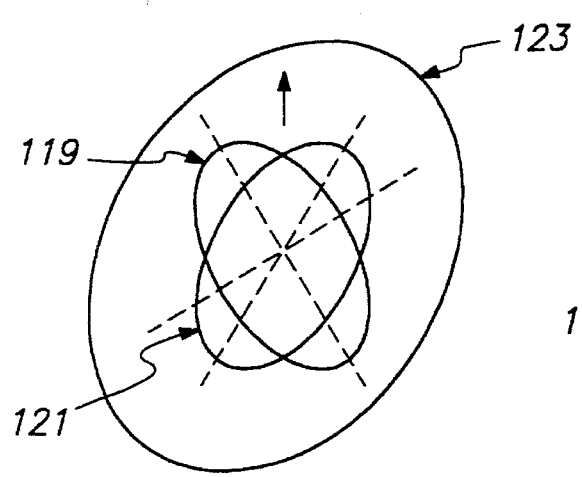
FIG. 8 is a graphical illustration of the magnitude of the individual and combined bending moments of inertia about the z-axis of ends 111, 113.

Referring to FIG. 5, the ends 111, 113 of a tensioned wire are illustrated attached to insulators 115, 117. Wire end 111 has a bending moment profile 119 which is shown in FIG. 6. Wire end 113 has a bending moment profile 121 which is shown in the graph of FIG. 7. As discussed above, the wire bends in substantially the same direction on both ends when the wire is vibrated in its fundamental mode, and the total bending moment profile may be found by adding the bending moment of each of ends 111, 113. FIG. 8 shows the total bending moment profile 123 which is comprised of bending moment profile 119 added to bending moment profile 121.

The total anisoelasticity may be reduced to a minimum, (equivalent to making the total bending moment profile 123 as round as possible) by rotating ends 111, 113 relative to each other. Given fixed ansioelasticity at each wire end 111, 113, the minimum overall anisoelasticity may be obtained by rotating insulators 115, 117 about the wire axis so that the strong principal axis at end 111 is aligned with the weak principal axis at end 113.

Figure 9:
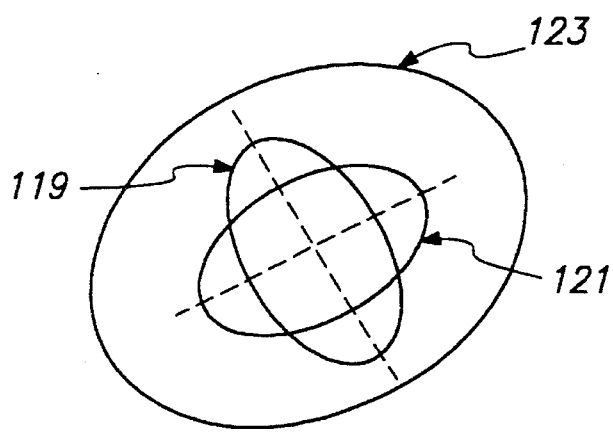
FIG. 9 is a graphical illustration of the magnitude of the individual and combined bending moments of inertia about the z-axis of ends 111, 113 after twisting wire 13, 15 to align major and minor axes.

FIG. 9 illustrates the optimum rotation of end 111 and bending moment profile 119, so that its strong principal axis is aligned to the weak principal axis of end 113 and its bending moment profile 121. If the magnitude of anisoelasticity is the same for each end, the total anisoelasticity may be eliminated with proper rotation of ends Ill, 113, and the total bending moment 123 becomes circular. However, if the magnitude of anisoelasticity for each end 111, 113 is not the same, the total anisoelasticity may not be completely eliminated by simple end rotation, and the total bending moment 123 will not become completely circular.

Figure 10:
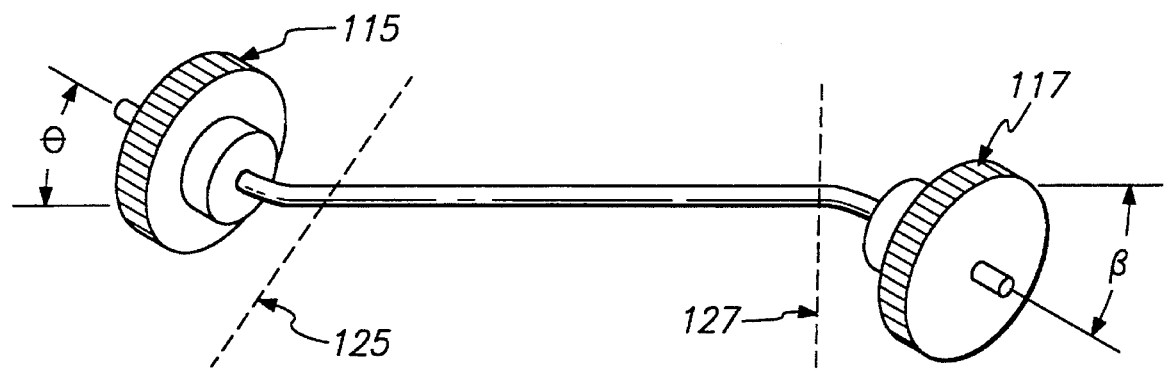
FIG. 10 is a diagram illustrating a tensioned wire end and the insulators according to the present invention where the ends are being rotated by respective angles theta and beta.

Referring to FIG. 10, insulator 15 is rotated an angle theta around an axis 125, which is pependicular to the wire axis. This introduces some anisoelasticity aligned to axis 125. On the other end of the wire, insulator 17 is rotated an angle beta around axis 127, which is perpendicular to the wire axis, and perpendicular to axis 125. This introduces some anisoelasticity aligned to axis 127. By adjusting the amount of end rotation theta and beta, a resultant anisoelasticity may be implemented which perfectly counter balances the original anisoelasticity due to manufacturing imperfections.

In describing the wire dynamics and signal processing, the predominant source of precession of vibrating wires 13, 15 is referred to as anisoelasticity. When wires 13, 15 are vibrated in a direction which is not aligned to a principal axis of the moment of inertia of the restoring force, the respective cross sections develop an elliptical orbit described by the following equation:

$$dB/dt = \text{Omega}*(\tfrac{1}{2}*A*\text{delta}*\sin(2*\text{phi}) - B/Q) \quad \text{(Eq. 1)}$$

where dB/dt=rate of change of the minor axis length of the elliptical orbit;

omega=string vibration frequency;

A=length of the major axis of the elliptical path;

delta=(strong principle axis resonance frequency-weak principle axis resonance frequency)/omega, where delta is referred to as the anisoelasticity factor;

phi=wire vibration plane angle measured from the strong principle elastic axis;

B=the minor axis length of the elliptical orbit;

Q=quality factor of wire vibration, which is inversely proportional to damping.

In summary the elliptical orbit width forms at a rate proportional to the anisoelasticity factor, and decays at a rate proportional to the existing elliptical width due to damping.

The precession of the respective elliptical orbits of vibrating wires 13, 15 in the presence of a nonlinear restoring force is given as:

$$\text{plane\_omega} = -(\text{omega}*\text{epsilon}*A*B)/4 \quad \text{(Eq. 2)}$$

where plane_omega=the precession rate of the wire vibration plane epsilon=nonlinearity coefficient of wire restoring force In summary, the precession of the vibration plane due to elliptical orbit is proportional to the nonlinearity coefficient and the elliptical orbit minor axis length.

The case rotation (i.e. rotation of frame 19 in a housing or case) can be substantially described as:

$$\text{case\_omega} = K1*\text{theta} + K2*d(\text{theta})/dt + \text{plane\_omega} \quad \text{(Eq. 3)}$$

where case_omega=rotation of the case;

theta=angle between the vibration plane and the case;

d(theta)/dt=rate of change of the angle between the vibration plane and the case;

plane_omega=rotation rate of the vibration plane due to elliptical orbit and nonlinearity;

K1 and K2 are constants.

Substituting equation 2 for plane_omega into equation 3 for case_omega, and assuming that wire_omega, epsilon, and A are constant, $$\text{case\_omega} = K1*\text{theta} + K2*d(\text{theta})/dt + K3*B \quad \text{(Eq. 4)}$$

where case_omega=rotation rate of the case;

theta=angle between the vibration plane and the case;

d(theta)/dt=rate of change of the angle between the vibration plane and the case;

B=minor axis length of the elliptical orbit;

K1, K2 and K3 are constants.

In summary to determine the case rotation, the angle theta and the elliptical orbit minor axis length B must be measured.

Figure 11:
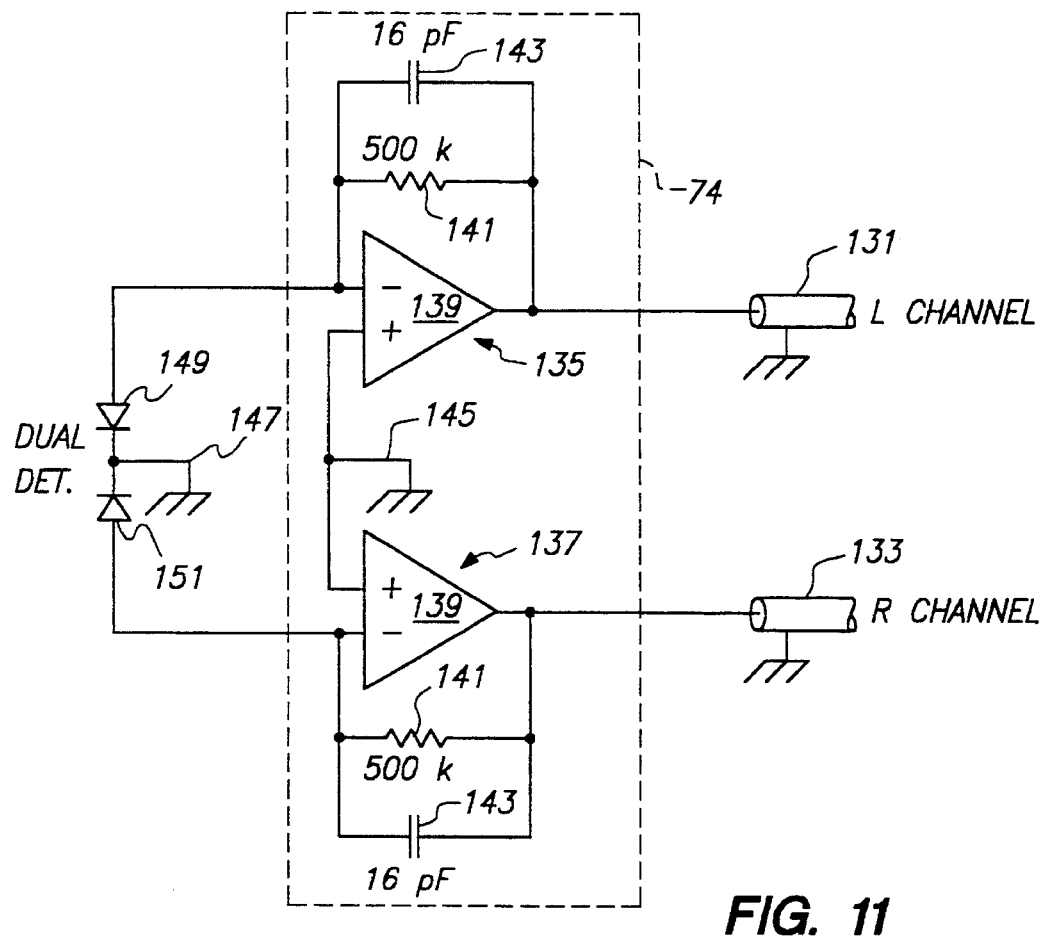
FIG. 11 is a circuit diagram of the photosensor and preamplifier according to the present invention.

Referring to FIGS. 1 and 11, an alternate embodiment is shown in which a light sensor 67 includes dual photosensors 149, 151 are set in parallel on the sensor frame 72. The stationary shadow 65 of wire 13 or 15 lies between photosensors so that vibration of the wire in either lateral direction causes one of photosensors to sense more light and the other photosensor to sense less light as wire shadow 65 varies with the motion of wire 13 or 15. Photosensors connect to pre-amplifier 74 which produces voltage signals based on the light incident on the respective photosensors at the outputs of reverse-set amplifier circuits 135, 137. Each amplifier circuit 135, 137 includes model AD746 operational amplifier 139 with a negative feedback circuit connected between output and inverting input and including parallel-connected 500 k-ohm resistor 141 and 16 pico-farad capacitor 143 to limit high frequency gain, thus reducing high frequency noise. The amplifier circuits 135, 137 have both non-inverting inputs grounded 145. Diodes 149, 151 are held at zero voltage bias to reduce leakage current noise.

Figure 12:
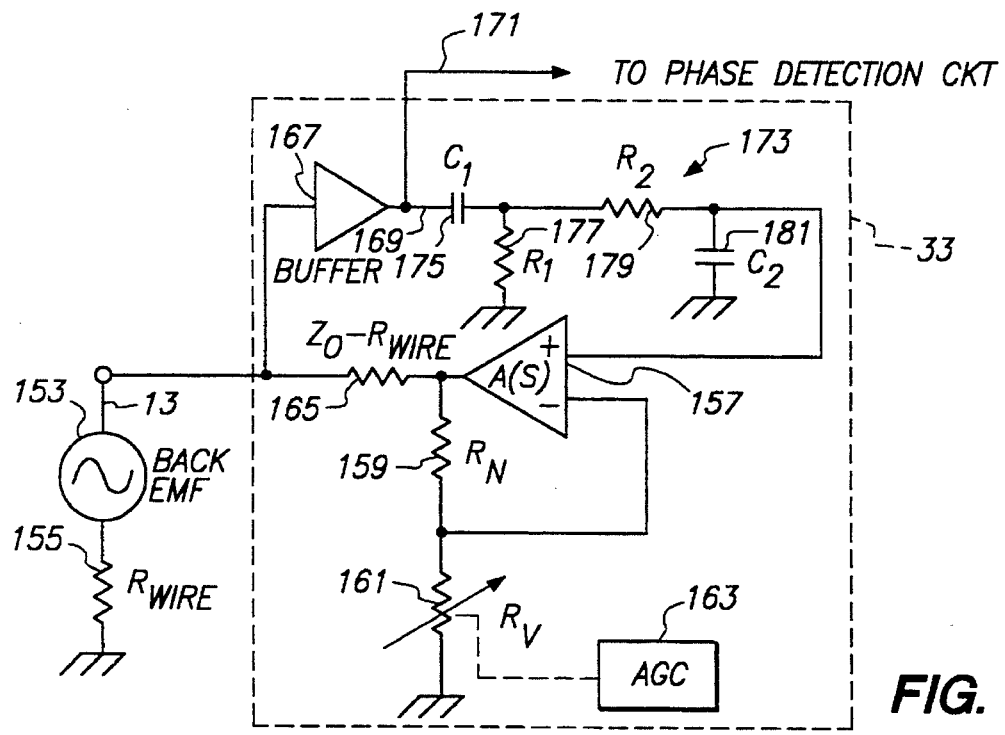
FIG. 12 is a circuit diagram showing oscillator 33 in reference to wire 13, 15 according to the present invention.

Referring to FIG. 12, oscillator circuit 33 (or 35) of FIG. 1 is shown connected to current carrying wire 13 (or 15). Vibrational movement of the wire through a magnetic field develops a counter-emf which is modeled as a voltage source 153 and resistor 155, where the resistor 155 corresponds to the resistance of wire 13. Oscillator 33 includes an operational amplifier 157 with the inverting input connected between resistor 159 and the variable resistor 161 to ground that is controlled in conventional manner by automatic gain controller 163. Resistor 159 and output impedence 165 are connected to the output of operational amplifier 157. Impedance 165 connects to wire 13 to provide a path for the oscillating current from the output of amplifier 157 to wire 13. Buffer amplifier 167 connects to wire 13 to receive the counter emf-signal and pass the signal in parallel to a bandpass feedback path 169 and to a phase detection path 171. The bandpass feedback path includes a two-stage bandpass filter 173 connected to the non-inverting input terminal of amplifier 157. Filter 173 includes capacitor 175 and resistor 177 stage serially connected to resistor 179 and capacitor 181 stage.

Figure 13:
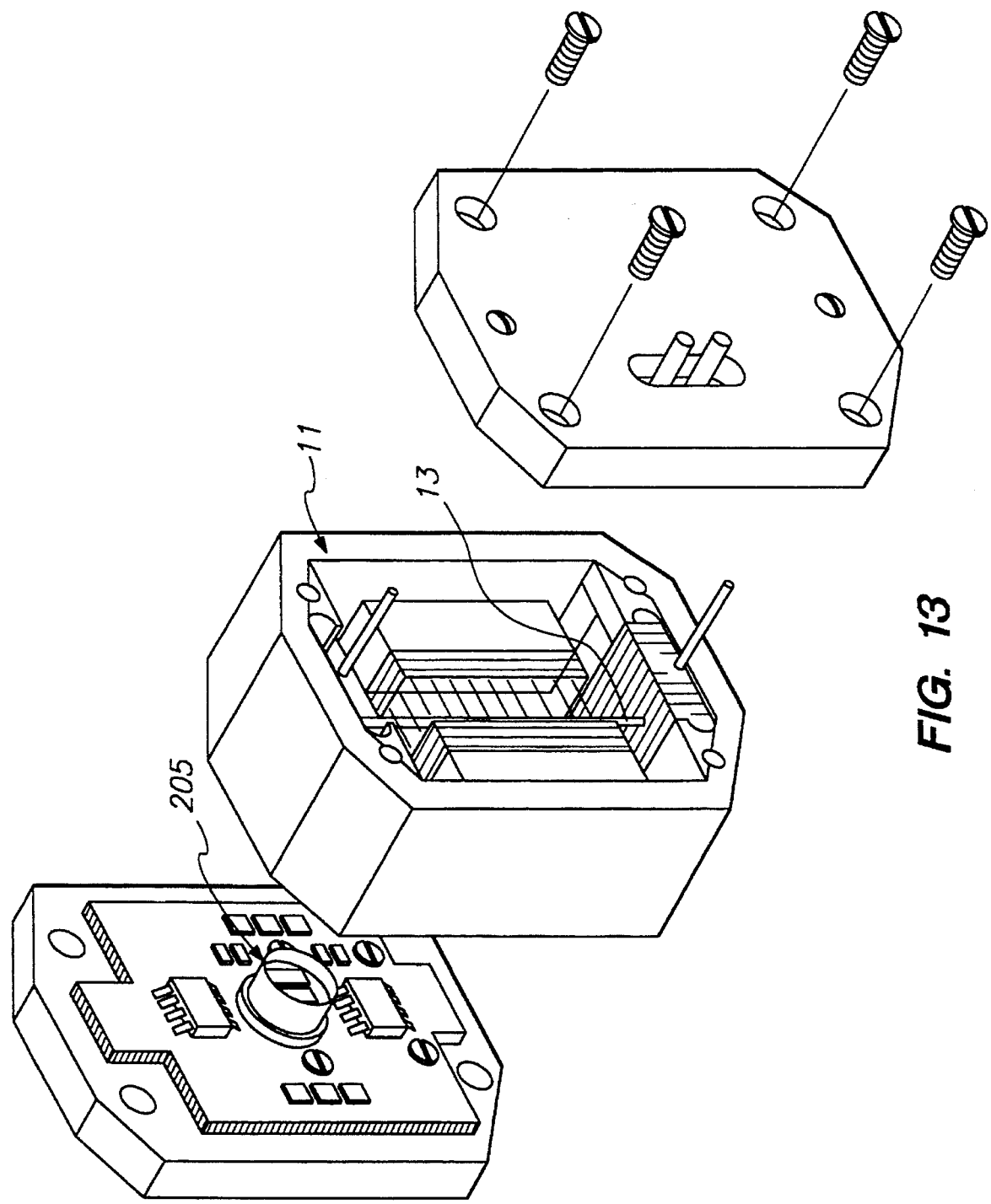
FIG. 13 is a diagram of a single wire gyroscope according to the present invention.

Referring to FIG. 13, there is shown a pictorial view of an alternate embodiment of wire gyroscope 11 with a single vibrating wire 13 and a photodiode 205 with dual photosensors to detect motion of the wire in the side to side direction.

Figure 14:
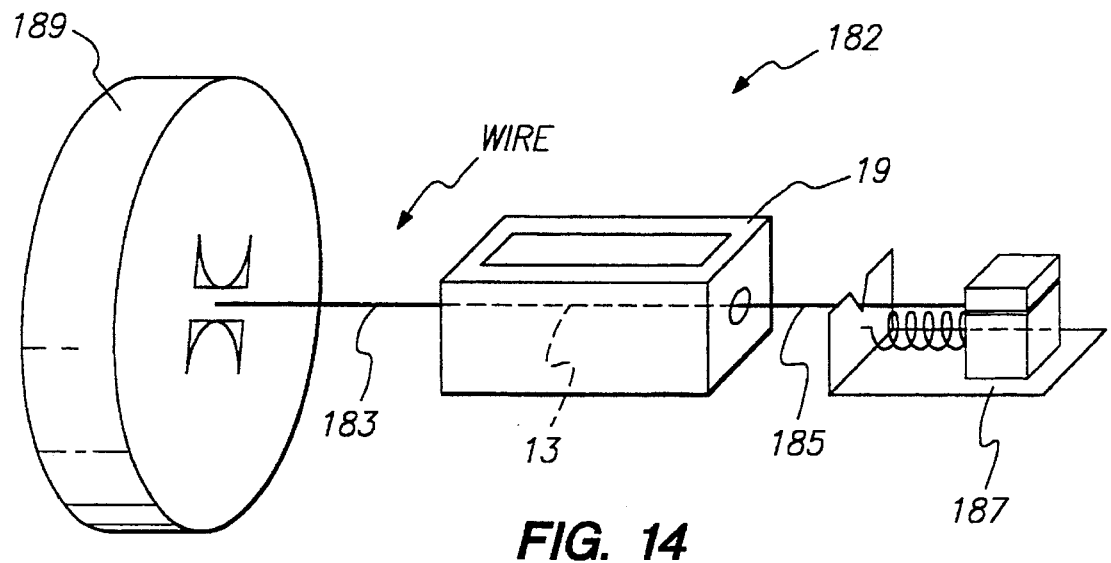
FIG. 14 is a diagram of an apparatus for manufacturing the gyroscope according to the present invention.

Referring to FIG. 14, a manufacturing apparatus 182 is shown with frame 13 disposed to tension the wire. The wire gyroscope 11 is constructed by tensioning wire 13 (or 15) across the interior cavity of frame 19 and between magnets 39, 41, 43, 45. Tensioning of wire 13 is accomplished by passing ends 183, 185 of wire 13 through corresponding holes 17 and insulators 21, 23 (shown in FIG. 1). End 185 is gripped and pulled by tensioning apparatus 187 while end 183 is held securely by clamping apparatus 189. With tensioning apparatus 187, wire 13 is tensioned to a tautness determined by the desired resonant frequency. Once wire 13 has been tensioned properly, ends 185 and 183 are secured under tension to insulators 21 and 23 and the tensioning apparatus is detached. Ends 185 and 183 are then connected to the oscillator. Once the resonance frequency is obtained, wire 13 will begin to form an elliptical path, and precess if there is any anisoelasticity. Tilt apparatus 189A and 189B are operated to bend wire 13 about the axes theta and beta until elliptical path formation is eliminated. Once wire 13 has been tilted sufficiently to eliminate anioelasticity, insulators 23 and 21 are fixed to frame 19.

Figure 15:
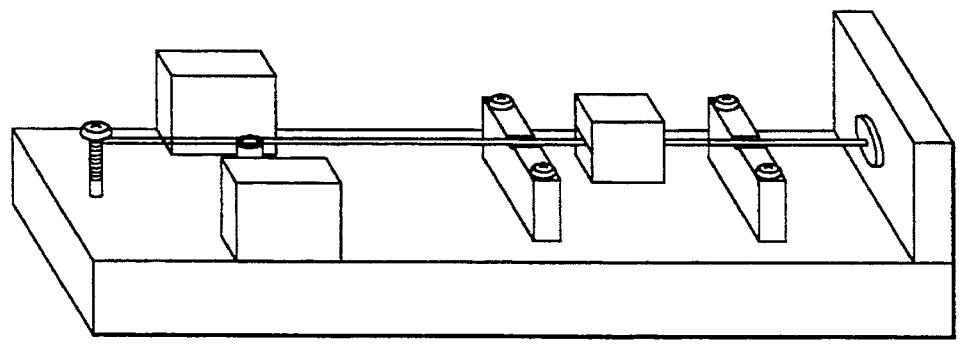
FIG. 15 is a pictorial illustration of an alternate apparatus for manufacturing the gyroscope according to the present invention.
Figure 16:
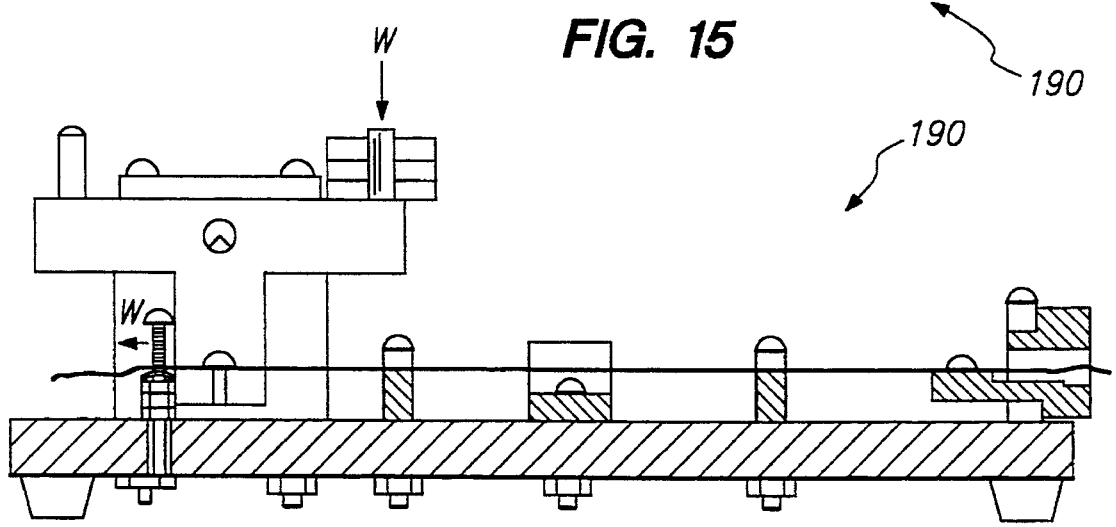
FIG. 16 is a sectional view of the apparatus of FIG. 15.

Referring to FIGS. 15 and 16, an alternate manufacturing apparatus 190 is shown for manufacturing wire gyroscope 11.

Figure 17A:
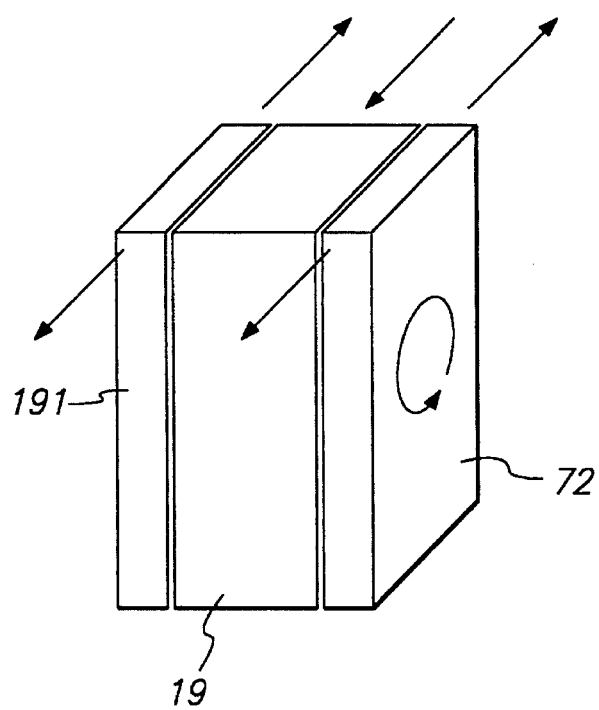
FIG. 17 is a diagram showing the relation of the frame and endplates according to the present invention.
FIG. 17B shows an alternate implementation of an optic sensing system.
FIG. 17C shows an alternate implementation of an optic sensing system.

Referring to FIG. 17, wire gyroscope 11 is assembled by sandwiching frame 19 between sensor frame 72 and LED endplate 191. LED endplate 191 fixes the position of LED 63 above wires 13, 15, as discussed previously. Sensor frame 72 fixes the position of photosensors 73, 75, 77 beneath wires 13, 15 for sensing light emitted from LED through frame 19. LED endplate 191, frame 19, and sensor frame 72 are manufactured with low carbon steel and are secured in relation to each other as by four screws passing through corresponding holes at each corner.

Figure 17B:
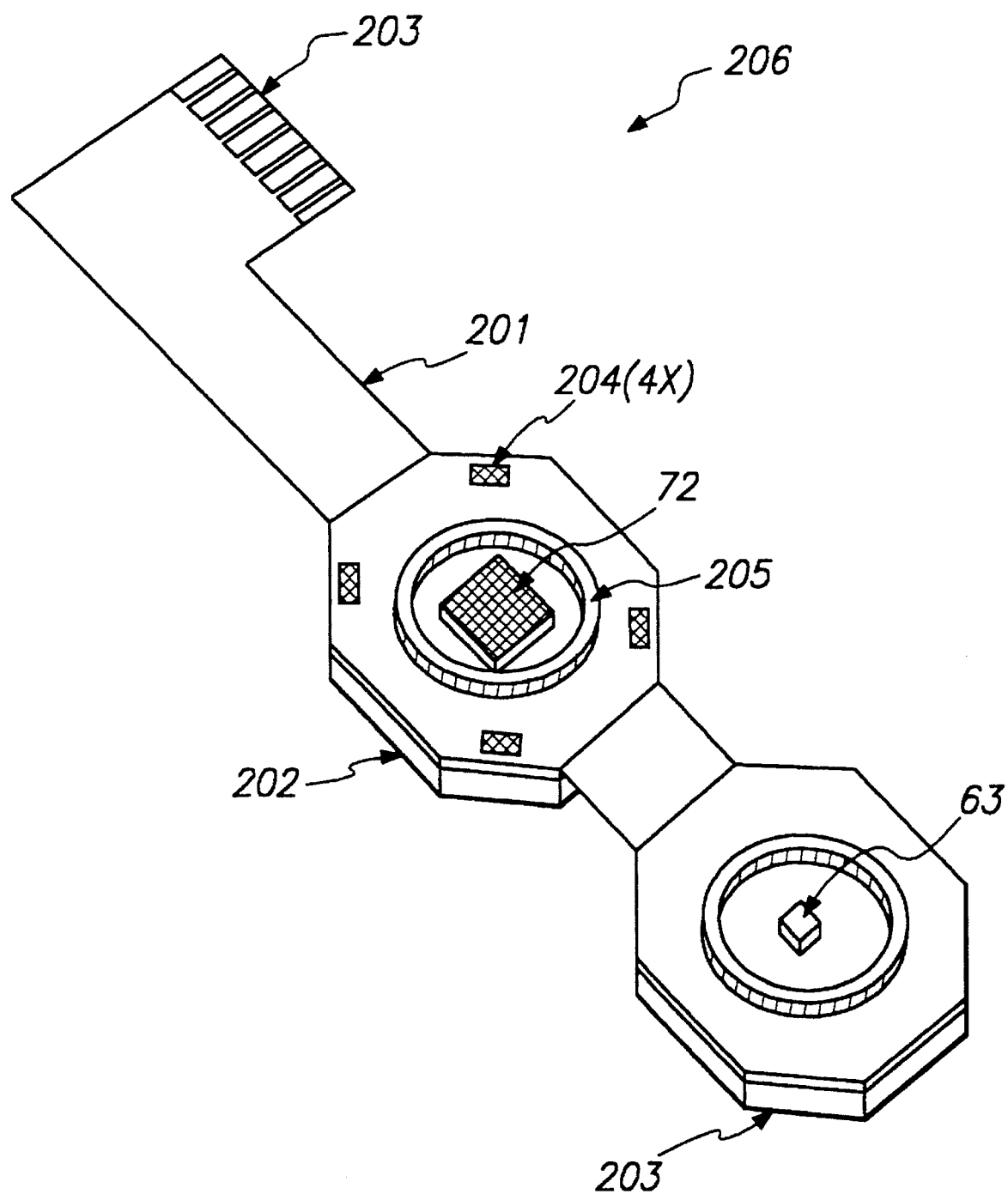
Figure 17C:
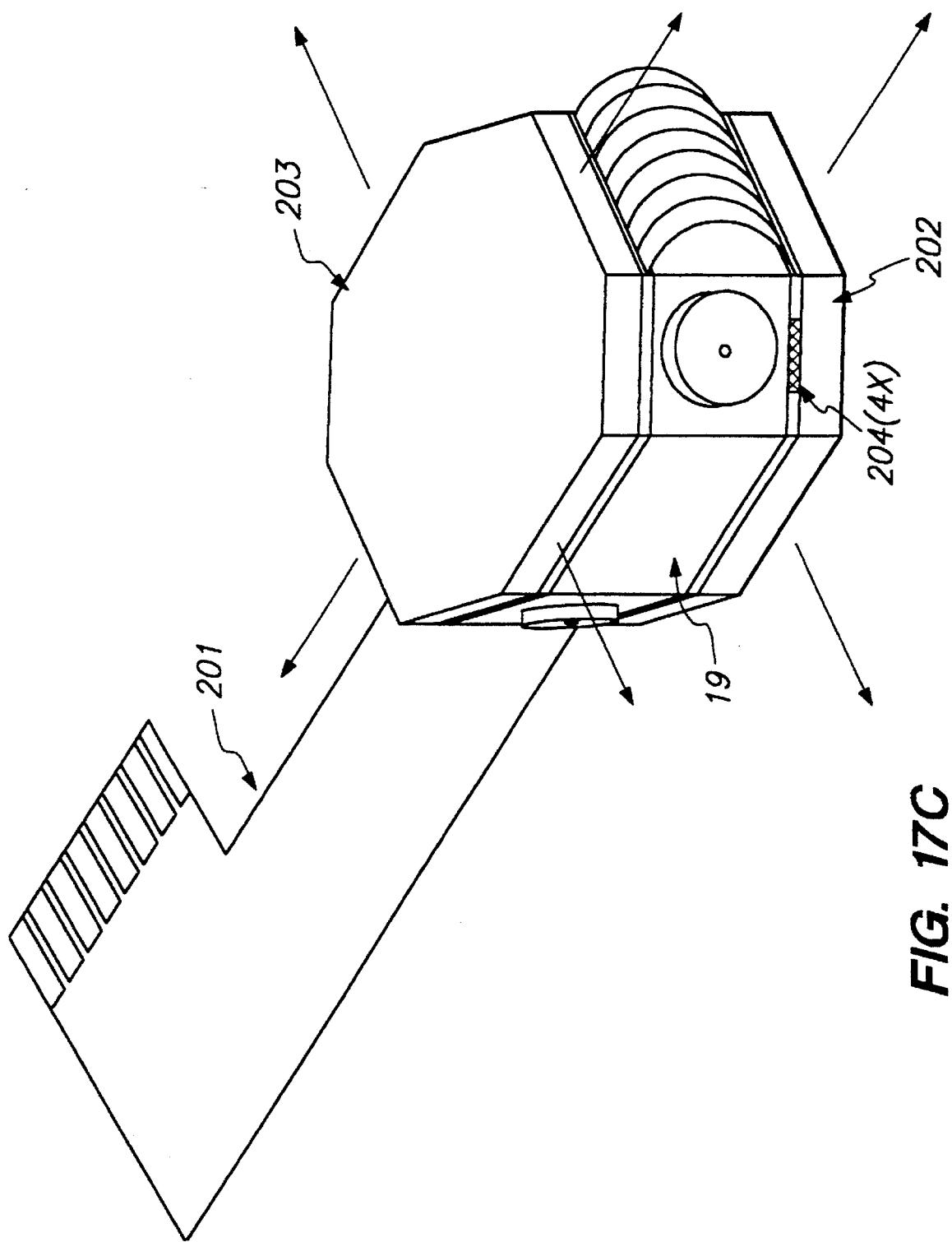

FIGS. 17B and 17C show an alternate method for implementing the optic sensing system.

Monolithic photodiode 72 and LED 63 are attached and wire bonded to flexible circuit 201, which has metal (ferromagnetic stainless steel) endplates 202 and 203. Flexible circuit 201 contains etched traces (gold plated copper) to perform electrical interconnection between the connector portion 203 and the semiconductors, as well as solder pads 204. Solder pads 204 are used to connect to each end of wires 13 and 15. Dam 205 is a ring of black plastic, or a ring of dispensed epoxy. It serves as a mechanical protection for the semiconductors, and a boundary for clear encapsulent, which may be used to further protect the semiconductors and wire bonds.

FIG. 17C shows the assembly of the "optical sensor flex circuit" (206) to the frame 19, which holds the wires, magnets, and insulators, which have been adjusted as described above.

Endplates 202 and 203 are positioned as shown by the indicated arrows in order to align LED 63 and photodiode 72 with wires 13 and 15. When the alignment is complete, the endplates are adhered to the frame 19, and electrical connection from each end of each wire is made to solder pads 204.

Figure 18:
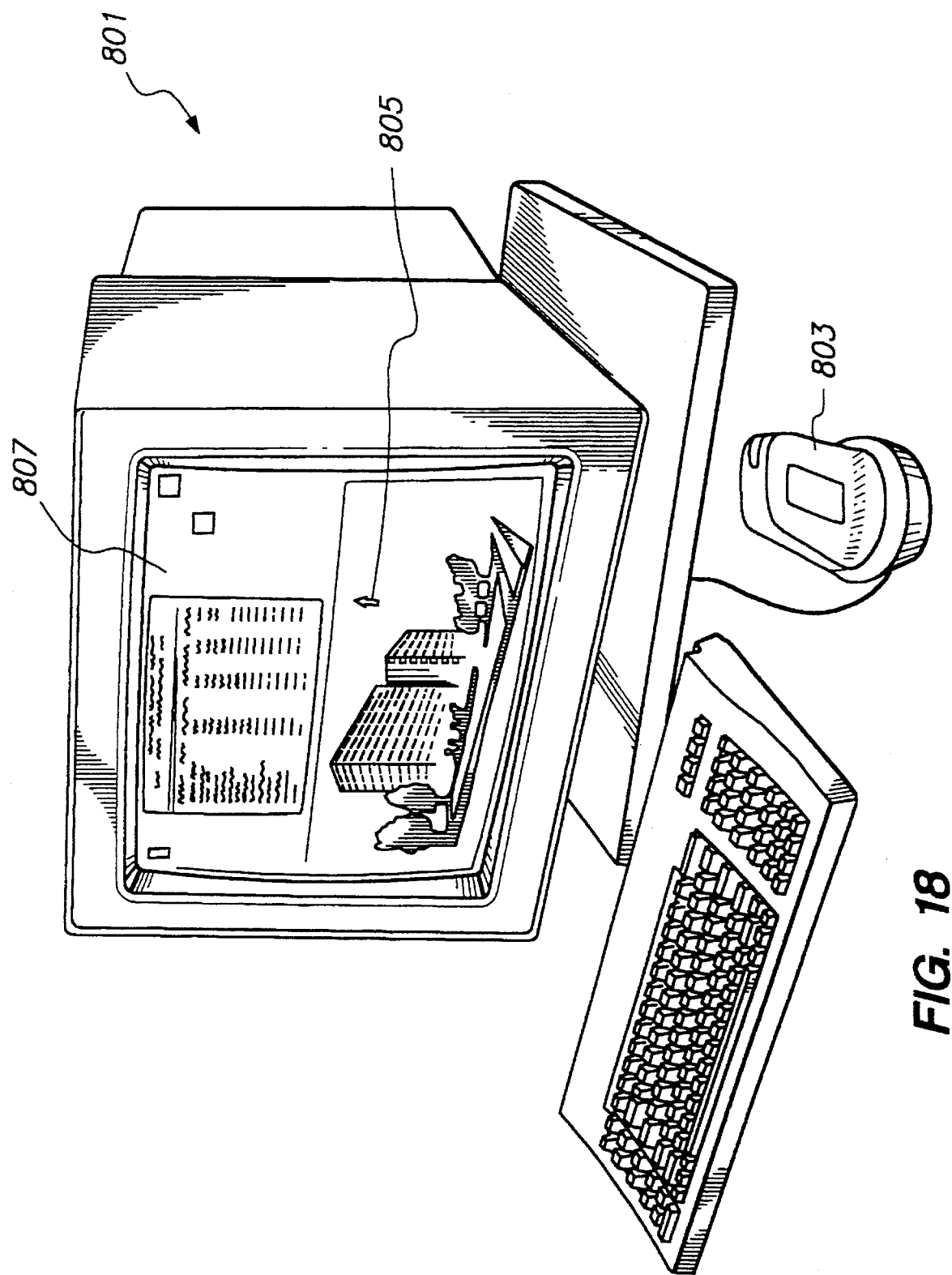
FIG. 18 is a diagram of a computer system including a mouse with a wire gyroscope according to the present invention.

Referring to FIG. 18, computer system 801 is shown including mouse 803 with gyroscope 11 (FIG. 1) for controlling the movement of cursor 805 on display console 807. As mouse 803 is moved in orientation, gyroscope 11 detects the motion and signals a corresponding motion by cursor 805. Mouse 803 does not require a surface such as a table top in order to signal a shift in position of the cursor since the signal is initiated by simply changing the orientation of mouse 803 which contains gyroscope 11. Upon a change in the orientation of mouse 803, the orientation of frame 19 (FIG. 1) is shifted along with the magnets. With a change in the position of the magnetic fields, wires 13, 15 shift to compensate. During the compensating period, variations in the counter-emf and potential from the photosensors are used to determine an angle and direction of rotation in the respective two degrees of freedom. The two degrees of freedom may be translated into x-y coordinates on display 807 and signals may be interpreted from gyroscope 11 by computer 801 to move the cursor to an x-y coordinate position.

What is claimed is:

1. A gyroscopic device for sensing motion and comprising:

a frame;

a first tensioned wire having first and second ends suspended by the frame and including a suspended wire portion therebetween:

a first pair of magnets mounted on the frame and having opposite poles spaced apart about the first tensioned wire for forming a first gap and a first magnetic field therein oriented across the first gap with the suspended wire portion of the first tensioned wire disposed within the first magnetic field;

a first oscillator connected to the first tensioned wire for supplying a first oscillating signal to the first tensioned wire to vibrate the first tensioned wire within the first magnetic field in substantially perpendicular orientation thereto and at a selected vibration frequency;

a source of radiation spaced above the first tensioned wire for radiantly illuminating a selected portion thereof;

a detector spaced beneath the first tensioned wire for producing a first output proportional to lateral displacement of a portion of the first tensioned wire along the first magnetic field in response to variations in the radiant illumination received thereby caused by the vibrating first tensioned wire; and a first circuit connected to the first tensioned wire and responsive to back potential on the first tensioned wire for producing a second output proportional to velocity of vibration of a portion of the first tensioned wire in a direction substantially perpendicular to the first magnetic field.

2. A device as in claim 1 wherein the device comprises:

a demodulating circuit connected to the first circuit and to the detector for combining the first and second outputs to produce an output indication of magnitude and direction of displacement of the first tensioned wire.

3. A device as in claim 1 wherein the frame comprises:

a pair of opposing sides with openings therein for supporting the first and second ends of the first tensioned wire; and a pair of insulators disposed in the openings for supporting the first tensioned wire under tension in the frame and for electrically insulating the first tensioned wire therefrom.

4. A device as in claim 1 comprising:

a second tensioned having first and second ends suspended by the frame and including a suspended wire portion therebetween disposed in skewed orientation relative to the suspended wire portion of the first tensioned wire;

a second pair of magnets mounted on the frame and having opposite poles spaced apart about the second tensioned wire for forming a second gap and a second magnetic field therein oriented across the second gap with the suspended wire portion of the second tensioned wire disposed within the second magnetic field;

a second oscillator connected to the second tensioned wire for supplying a second oscillating signal to the second tensioned wire to vibrate the second tensioned wire within the second magnetic field in substantially perpendicular orientation thereto and at a selected vibration frequency;

the source of radiation spaced above the second tensioned wire for radiantly illuminating a selected portion of the second tensioned wire;

a detector spaced beneath the second tensioned wire for producing a third output proportional to lateral displacement of a portion of the second tensioned wire along the second magnetic field in response to variations in the radiant illumination received thereby caused by the vibrating second tensioned wire; and a second circuit connected to the second tensioned wire and responsive to back potential on the second tensioned wire for producing a fourth output proportional to velocity of vibration of a portion of the second tensioned wire in a direction substantially perpendicular to the second magnetic field.

5. A device as in claim 1 wherein the oscillator comprises:

an amplifier having an input connected to the first tensioned wire, and having an output for supplying to the first tensioned wire the first oscillating signal responsive to the back potential applied to the input in response to vibration of the portion of the first tensioned wire in a direction substantially perpendicular to the first magnetic field; and a feedback circuit connecting the output of the amplifier to the input of the amplifier.

6. A device as in claim 1 wherein the source of radiation comprises:

a light emitting diode (LED) connected to a signal source for emitting radiation toward the detector.

7. A device as in claim 6 wherein the detector comprises:

a reference photosensor disposed beneath the first tensioned wire for receiving unobstructed radiation from the source for producing a reference electrical signal in response to the radiation; and a controller connected to the signal source and to the LED for moderating signal supplied to the LED from the signal source in response to the reference electrical signal.

8. A device as in claim 7 wherein the controller comprises:

an operational amplifier having a first input connected to the signal source, and having a second input connected to the reference photosensor for receiving the reference electrical signal, and having an output connected to the LED for supplying an output signal representative of the relation between signal supplied to the LED from the signal source and the reference electrical signal.

9. A device as in claim 1 wherein the detector includes a photodiode positioned in relation to the source of radiation for receiving radiation therefrom that varies in response to lateral displacement of the first tensioned wire along the first magnetic field.

10. A device as in claim 1 wherein a demodulating circuit including a first mixer connected to receive a first portion of the second output and a first portion of the first output for producing a first signal as a combination of the portions of the first and second outputs applied thereto;

a phase shifter connected to receive the second output for shifting phase of a second portion of the second output by 90 degrees to produce a first displacement signal proportional to a first displacement of the first tensioned wire in a first direction;

a second mixer connected to receive the first output and the first displacement signal for producing a second signal as a combination of a second portion of the first output and the first displacement signal;

a differentiator connected to receive the second signal for producing a derivative signal as the derivative of a portion of the second signal; and an adder connected to receive the first signal, the second signal and the derivative signal for producing an angular rate signal therefrom proportional to an angular rate of rotation of the frame.

11. A device as in claim 1 wherein the first end of the first tensioned wire is twisted in relation to the second end thereof in order to reduce an anisoelastic effect.

12. A device as in claim 1 wherein the first and second ends of the first tensioned wire are disposed with respect to the frame for introducing a bending moment of selected orientation and magnitude upon each end of the first tensioned wire;

the bending moment and the orientation thereof varying according to an amount of anisoelasticity compensation desired.

13. A device as in claim 1 wherein the first end of the first tensioned wire is twisted an angle theta about a longitudinal axis of the first tensioned wire with respect to the second end thereof in order to reduce precession of the vibrating first tensioned wire for providing an indication of rotation of the device from a reference orientation.

14. A device as in claim 1 wherein rotation of the device from a reference orientation is determined according to the expression:

$$K1*theta+K2*d(theta)/dt+K3*B;$$

where theta=the angle between a central plane of the frame and a major elliptical axis of the cross section of the path of vibration of the first tensioned wire;

B=a minor elliptical axis of the cross section of the path of vibration of the first tensioned wire; and K1, K2, and K3 are selected constants.

15. A method for measuring motion comprising the steps of:

suspending a wire having ends under tension within a magnetic field perpendicular to it longitudinal axis of the wire;

applying a fluctuating current to the wire to induce vibration thereof within the magnetic field;

sensing a counter-potential across the wire as a function of vibrational velocity thereof within the magnetic field;

forming from the counter-potential sensed across the wire a first velocity signal representative of a first direction of vibrational movement of the wire perpendicular to the magnetic field;

radiantly illuminating the wire substantially in a plane of vibrational movement of the wire within the magnetic field for forming a shadow of the wire on a surface spaced from the wire;

detecting variations in radiation upon the surface indicative of movement of the wire in a second direction parallel to the magnetic field; and, forming a first displacement signal as a function of the variation in radiation upon the surface.

16. A method as in claim 15 comprising the step of:

combining the first displacement signal and the first velocity signal to produce indications of magnitude and direction of displacement of the wire.

17. A method as in claim 15 wherein the step of applying the fluctuating current includes the steps of:

generating an amplified output current in response to an applied input;

applying a first portion of the output current to the wire;

sensing across the wire a counter-potential that is representative of the velocity of the vibrating wire within the magnetic field; and forming the applied input as feedback from the counter-potential.

18. A method as in claim 15 wherein a source of radiation illuminates the wire and comprises the steps of:

powering the source of radiation to illuminate the wire and form a shadow thereof on a surface spaced away from the wire in a direction perpendicular to the magnetic field;

detecting a portion of radiation incident upon the surface substantially unaltered by the wire;

generating a reference electrical signal in response to the incident radiation detected on the surface; and altering the power provided to the source in response to the reference electrical signal.

19. The method as in claim 16 comprising the steps of:

multiplying a first portion of the first velocity signal and a first portion of the first displacement signal to produce a first signal;

shifting the phase of a second portion of the first velocity signal by 90 degrees to produce a second displacement signal proportional to a second displacement of the wire in the first direction;

multiplying a second portion of the first displacement signal and the first displacement signal to produce a second signal;

differentiating a portion of the second signal with respect to time to produce a derivative signal; and adding the first signal, the second signal and the derivative signal to produce an output indicative of an angular rate of rotation.

20. A method as in claim 15 wherein the step of suspending the wire includes twisting the wire along the longitudinal axis of the wire to reduce anisoelastic effects thereof.

21. A method as in claim 15 wherein the step of applying the fluctuating current includes imposing a bending moment upon each end of the wire varying according to the anisoelasticity of the wire.

22. A method as in claim 15 comprising the step of:

relatively twisting the ends of the wire by an angle theta about a longitudinal axis of the wire to reduce precession thereof and determine an amount of motion from a reference orientation around a longitudinal axis of the wire.

23. A method as in claim 15 comprising the steps of:

relatively twisting the ends of the wire until precession thereof is substantially eliminated.

24. The method as in claim 15 comprising the step of:

determining angular motion of the vibrating wire in a direction about the longitudinal axis thereof, according to the expression:

$$K1*theta+K2*d(theta)/dt+K3*B;$$

where theta=the angle between a plane of the magnetic field and a major elliptical axis of the cross section of the path of vibration of the wire;

B=a minor elliptical axis of the cross section of the path of vibration of the wire; and K1, K2, and K3 are selected constants.

25. A device for measuring orientation and attitude including a frame;

first tensioned wire and second tensioned wire supported on the frame and axially disposed perpendicularly with respect to each other;

a source of oscillating electrical signal for each wire connected to supply oscillating current through respective first and second wires;

first and second magnetic field sources positioned in fixed relation to the frame for developing first and second magnetic fields about portions of the first and second wires for producing vibrations of the first and second wires in respective first and second directions perpendicular to the respective first and second magnetic fields in response to the oscillating current supplied to the respective first and second wires;

first and second sensors connected to the respective first and second tensioned wires for sensing counter-potentials thereon that are representative of vibrating velocities of the first and second tensioned wires, respectively, in the first and second directions for producing first and second velocity signals therefrom;

a light source for illuminating the first and second wires and casting a shadow image thereof onto a plane spaced away from the first and second tensioned wires; and a light sensor disposed on the plane to receive the shadow image for developing first and second sensor signals indicative of fluctuations of the shadow images of the first and second tensioned wires, respectively, the first and second sensor signals being proportional to the deflections of the respective first and second tensioned wires in directions parallel to the respective first and second magnetic fields.

26. A device as in claim 25 comprising:

a first demodulating circuit connected to receive the first velocity signal and the first sensor signal to produce an output therefrom indicative of magnitude and direction of displacement of the first wire in a direction parallel to the magnetic field therefor; and a second demodulator connected to receive the second velocity signal and the second sensor signal to produce an output therefrom indicative of magnitude and direction of displacement of the second wire in a direction parallel to the magnetic field therefor.

27. A device as in claim 25 wherein each of the wires includes first and second ends;

the frame including first and second pairs of opposing sides with openings therein for supporting the first and second ends of each wire; and first and second pairs of insulators holding the wires under tension and insulating respective said ends of the wires from the frame.

28. A device as in claim 25 wherein the first and second magnetic field sources have pole faces that are disposed on the frame for developing third and fourth magnetic fields;

the first and second tensioned wires including first and second suspended areas, respectively, that are suspended between pole faces of respective said third and fourth magnetic fields.

29. A device as in claim 25 wherein each of said source of the oscillating signal includes an oscillator comprising:

an amplifier having an input and having an output connected to supply fluctuating current to a respective one of the first and second tensioned wires in response to a signal applied to the input thereof; and the input connected to the respective wire for receiving counter potential generated across such wire by the vibrational movement of the wire in a magnetic field associated therewith.

30. A device as in claim 25 wherein the light source comprises:

a light emitting diode positioned to illuminate the first and second tensioned wires and the light sensor disposed on the plane that is spaced away from the first and second tensioned wires; and a source of electrical signal connected to power the light emitting diode.

31. A device as in claim 25 wherein the light sensor comprises:

a reference photosensor for receiving unobstructed illumination from the light source for generating a reference electrical signal in response to illumination received thereby;

a source of electrical signal for supply to the light source; and a circuit for moderating the electrical signal supplied to the light source in response to the reference electrical signal.

32. A device as in claim 31 wherein the circuit comprises:

an operational amplifier having first and second inputs, and an output;

the first input of the operational amplifier being connected to the source of electrical signal supplied to the light source for receiving the electrical signal therefrom;

the second input of the operational amplifier being connected to the reference photosensor for receiving the reference electrical signal; and the output of the operational amplifier being connected to the light source for supplying power thereto representative of a combination of said electrical signal and said reference electrical signal.

33. A device as in claim 25 wherein the light sensor comprises:

first and second photodiodes, each positioned in relation to the light source for receiving illumination therefrom of varying intensity indicative of positions of respective ones of the first and second tensioned wires along the direction of the respective first and second magnetic fields.

34. A device as in claim 26 wherein each of the source of oscillating signal includes:

an oscillator output connected to supply respective one of the velocity signals to the respective demodulating circuit; and each demodulating circuit includes:

a first mixer connected to receive a first portion of respective velocity signals and a first portion of respective sensor signals for producing a first signal therefrom;

a phase shifter connected to receive a second portion of the respective velocity signal for shifting the phase thereof by 90 degrees to produce a first displacement signal proportional to a first displacement of the respective tensioned wire in the first direction;

a second mixer connected to receive a second portion of the respective sensor signal and the first displacement signal for producing a second signal therefrom;

a differentiator connected to receive the second signal for producing a derivative of a portion of the second signal as a derivative output signal; and an adder connected to receive the first signal, the second signal and the derivative signal to produce an angular rate signal therefrom that is proportional to an angular rate of rotation of the frame around a longitudinal axis of at least one of the first and second tensioned wires.

35. A device as in claim 25 wherein each of the first and second tensioned wires includes first and second ends;

each of the first ends being twisted in relation to the respective second ends for reducing anisoelastic effects in the respective first and second tensioned wires.

36. A device as in claim 25 wherein each of the first and second tensioned wires includes first and second ends supported on the frame; and mounts for each end of each wire supported on the frame to impose a bending moment upon each end of each of the wires;

the bending moment at each end varying according to the respective anisoelasticity of each of the wires.

37. A device as in claim 25 wherein each of the first and second tensioned wires includes first and second ends;

each of the first ends is twisted an angle theta about the longitudinal axis of the respective wire with respect to the respective second end in order to reduce precession of the respective wire in determining an amount of rotation of the device from a reference orientation.

38. A device as in claim 37 wherein the amount of rotation is determined according to the expression:

$$K1*theta + K2*d(theta)/dt + K3*B;$$

where theta = the angle between a plane of the magnetic field and a major elliptical axis of the cross section of the path of vibration of the wire;

B = a minor elliptical axis of the cross section of the path of vibration of the wire; and K1, K2, and K3 are selected constants.

39. A method for measuring motions with a vibrating wire comprising the steps of:

suspending the wire having ends, under tension within a magnetic field perpendicular to a longitudinal axis of the wire;

applying an oscillating current to the wire to vibrate the wire perpendicular to the magnetic field;

sensing counter-potential across the wire representative of vibrational velocity of the wire in the magnetic field;

forming from the counter-potential across the wire a first velocity signal representative of a first direction of movement of the wire perpendicular to the magnetic field;

illuminating the wire substantially in parallel with the plane of vibration toward a detection surface to cast a shadow of the wire onto the surface;

detecting variations in illumination upon the surface indicative of movement of the wire in a second direction parallel to the magnetic field; and producing a first displacement signal representative of the variations in illumination upon the surface.

40. A method as in claim 39 comprising the seep of:

combining the first displacement signal and the first velocity signal to produce magnitude and direction of displacement of the wire.

41. A method as in claim 39 wherein the step of applying the oscillating current includes the steps of:

generating an amplified output current responsive to an applied input;

applying the output current to the wire to vibrate the wire within the magnetic field;

generating a counter-potential in response to vibrational movement of the wire within the magnetic field; and forming the applied input as feedback from the counter potential.

42. A method as in claim 39 in which a light source provides the illumination, and wherein the illuminating step includes:

applying an electrical signal to power the light source for illuminating the wire;

detecting the illumination upon the surface unaltered by movement of the wire;

generating a reference electrical signal in response to incident illumination; and moderating the electrical signal applied to the light source in response to the reference electrical signal.

43. The method as in claim 40 wherein in the step of producing magnitude and direction, the method comprises:

multiplying a first portion of the first velocity signal and a first portion of the first displacement signal to produce a first signal;

shifting the phase of a second portion of the velocity signal by 90 degrees to obtain a second displacement signal proportional to a second displacement of the wire in the first direction;

multiplying a second portion of the first displacement signal and the first displacement signal to produce a second signal;

differentiating a portion of the second signal with respect to time to produce a derivative signal; and adding the first signal, the second signal and the derivative signal to produce an angular rate of rotation.

44. A method as in claim 39 wherein the step of suspending the wire includes:

twisting the wire along the longitudinal axis of the wire in order to reduce anisoelastic effects thereof.

45. A method as in claim 39 comprising:

imposing a bending moment upon each of the ends of the wire in magnitude and orientation according to the anisoelasticity of the wire.

46. A method as in claim 39 comprising the step of:

relatively twisting each of the ends by an angle theta about the longitudinal axis of the wire to reduce precession in determining an amount of rotation of the device from a reference orientation relative to a longitudinal axis of the wire.

47. A method as in claim 39 comprising the step of:

relatively twisting the ends until precession is substantially eliminated.

48. The method as in claim 39 comprising of:

determining the angle of rotation according to the expression:

$$K1*theta + K2*d(theta)/dt + K3*B;$$

where theta = the angle between a plane of the magnetic field and a major elliptical axis of the cross section of the path of vibration of the wire;

B = a minor elliptical axis of the cross section of the path of vibration of the wire; and K1, K2, and K3 are selected constants.

* * * * *